US012725587B2

(12) United States Patent
Grande

(10) Patent No.: US 12,725,587 B2
(45) Date of Patent: Sep. 1, 2026

(54) PLECTRUM WITH FOAM PAD ADHESIVE

(71) Applicant: Michael Grande, Marlboro, NJ (US)

(72) Inventor: Michael Grande, Marlboro, NJ (US)

( * ) Notice: Subject to any disclaimer, the term of this patent is extended or adjusted under 35 U.S.C. 154(b) by 241 days.

(21) Appl. No.: 18/434,552

(22) Filed: Feb. 6, 2024

(65) Prior Publication Data

US 2025/0252940 A1 Aug. 7, 2025

(51) Int. Cl.
*G10D 3/173* (2020.01)

(52) U.S. Cl.
CPC .................................... *G10D 3/173* (2020.02)

(58) Field of Classification Search
CPC ................................. G10D 3/173; G10D 3/00
See application file for complete search history.

(56) References Cited

U.S. PATENT DOCUMENTS

| | | | | | |
|---|---|---|---|---|---|
| 3,312,137 | A * | 4/1967 | Oddo | G10D 3/173 | 84/322 |
| 11,721,311 | B1 * | 8/2023 | Brown, Sr. | G10D 3/173 | 84/322 |
| 2008/0110319 | A1 * | 5/2008 | Morris | G10D 3/173 | 84/320 |
| 2014/0033894 | A1 * | 2/2014 | Taylor | B29C 45/14065 | 84/322 |

* cited by examiner

*Primary Examiner* — Kimberly R Lockett
(74) *Attorney, Agent, or Firm* — Sam Pierce

(57) ABSTRACT

A plectrum, comprising: a first pick configured for strumming a stringed instrument; an adhesive pad; and a second pick configured for strumming a stringed instrument, wherein the adhesive pad is positioned between the first pick and the second pick and wherein the adhesive pad is attached to the inner face of the first pick and the inner face of the second pick.

11 Claims, 4 Drawing Sheets

PLECTRUM WITH FOAM PAD ADHESIVE

BACKGROUND

Adaptations of traditional single plectrum designs to include two connected picks for striking a string instrument have been described in the prior art patent literature.

For example, U.S. Pat. No. 9,972,290 discloses a one-piece, hand-held device that enables users to pick, pluck or strum (strike) one or more strings of a stringed instrument simultaneously. The device comprises a first planar plectrum having a grasping location and a primary striking location in the same pick and a second planar plectrum secured to the first planar plectrum by a bracket, wherein the first planar plectrum is parallel, substantially parallel, or within ten degrees of parallel to the second planar plectrum. The result is a user experience that is substantially similar to that of using a traditional plectrum having a single striking surface, with the added functionality and benefit of an ancillary and integrated secondary striking surface for the purpose of striking one string twice of a stringed instrument, such as a guitar or a similar instrument, simultaneously.

U.S. Pat. No. 8,872,008 discloses a dual plectrum composite coupler comprising of a spacer material, the spacer material comprising an upper surface and a lower surface and a pivot core, which is embedded at least partially in the spacer material, the pivot core comprising a hardness which is greater than a hardness of the spacer material, and the coupler comprises dimensions and a shape which accommodate a pair of plectrums that can be respectively disposed on the upper and the lower surfaces of the coupler and when so disposed thereon, at least a tip of each of the plectrums does not contact the coupler. In one embodiment, the composite spacer material in the coupler has inherent adhesion quality to hold the pair of plectrums in place to a sufficient level for use on a stringed instrument when the composite coupler is sandwiched between two plectrums to form a dual plectrum system.

Nonetheless, prior art devices typically result in a low quality timbre and have limited versatility in creating tones. A need exists in the art for an improved dual pick plectrum.

SUMMARY OF INVENTION

Therefore, the present invention is a dual pick plectrum with two different gauge picks separated by an adhesive pad. It can be used with a guitar, mandolin, ukulele or bass. The use of different pick gauge thickness combinations allows for a greater range of tones to be produced by hitting the same string sequentially with two picks of different thickness. Strumming a guitar with the lighter gauge pick of the present invention hitting a string first will produce a different set of tones when striking the strings than strumming with the heavier gauge pick hitting the strings first followed by the lighter gauge pick.

According to one aspect of the present invention disclosed herein, there is provided a plectrum, comprising: a first pick configured for strumming a stringed instrument; an adhesive pad; and a second pick configured for strumming a string instrument, wherein the adhesive pad is positioned between the first pick and the second pick and wherein the adhesive pad is attached to the inner face of the first pick and the inner face of the second pick. In a preferred embodiment, the adhesive pad is a foam pad adhesive which is 2 mm to 3 mm thick.

DETAILED DESCRIPTION

The present invention allows for a 6-string guitar to simulate and expand the tone and dynamic range to be similar to a 12-string guitar or an effects processor. When strumming a 6-string guitar from the low (6th string) to the higher strings (the 1st string), the present invention replicates the sound similar to that of a 12-string guitar or that of an effects processor that will manipulate the tone.

Figure 1:
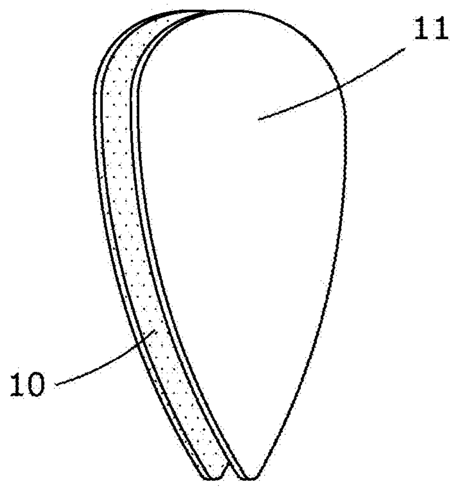
FIG. 1 is a perspective view of a plectrum with two picks joined by a foam pad adhesive according the present invention.

FIG. 1 is a perspective view of a plectrum with two picks joined by a foam pad adhesive according the present invention.

The present invention consists of a first pick 10 and a second pick 11 constructed from celluloid or ABS plastic.

First pick 10 has a heavier gauge, i.e., is thicker than second pick 11. The first pick and the second pick are optimally 0.4 mm to 1.2 mm thick.

It should be noted that the pick gauges and thicknesses can vary, and not be conveyed to be just 0.4 mm to 1.2 mm in thickness.

Figure 2:
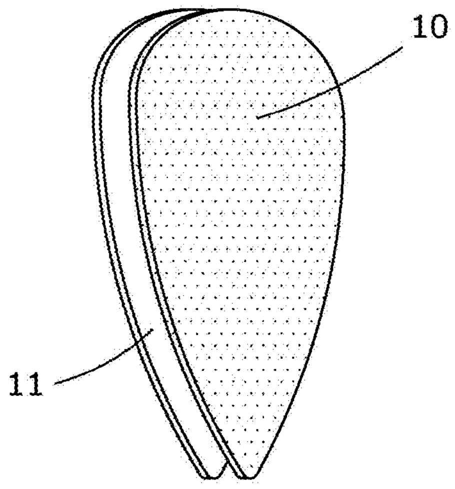
FIG. 2 is another perspective view of the preferred embodiment of the present invention.

FIG. 2 is another perspective view of the preferred embodiment of the present invention.

In the view of FIG. 2, first pick 10 and a second pick 11 are shown from the opposite side.

In a preferred embodiment, the first pick and the second pick are approximately triangular. The adhesive pad is positioned opposite one of the points of the triangle of the first pick and the second pick.

Figure 3:
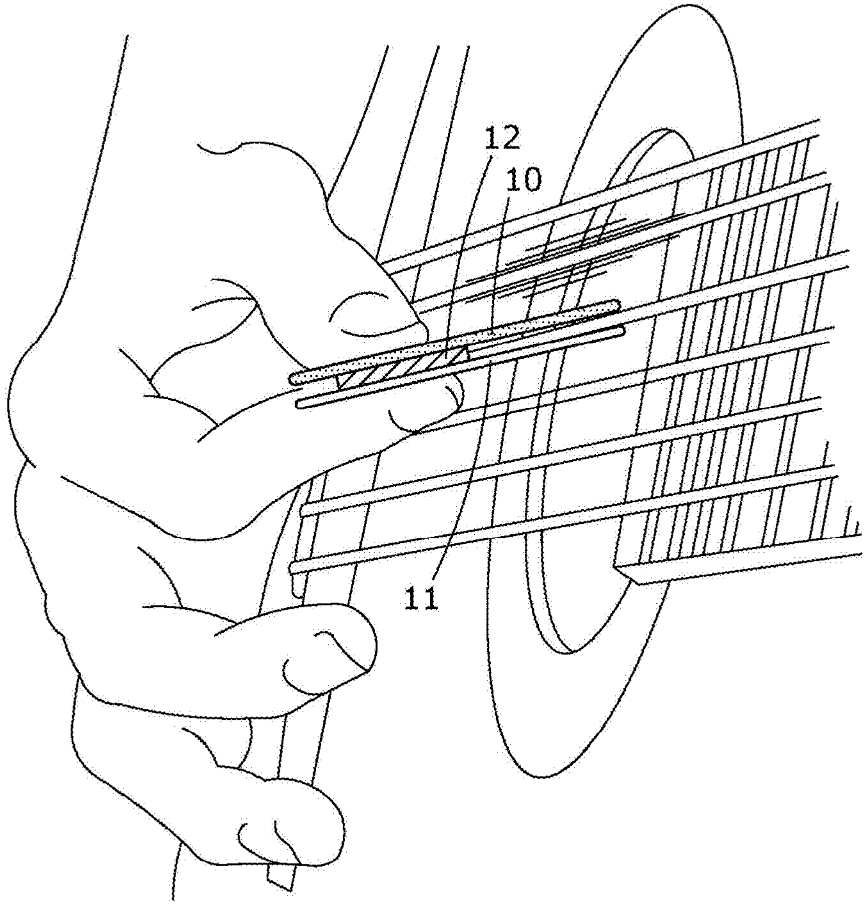
FIG. 3 is perspective view of the guitar being strum with the present invention, heavy gauge first.

FIG. 3 is perspective view of the guitar being strum with the present invention, heavy gauge first.

The two guitar picks have different gauges in a preferred embodiment. When strumming with the present invention, depending on how it is held the user can determine which gauge of the two guitar picks connected by the adhesive pad will hit the string first.

Thus, the present invention will provide two different sets of tones depending on which side of the pick strikes the string first.

Figure 4:
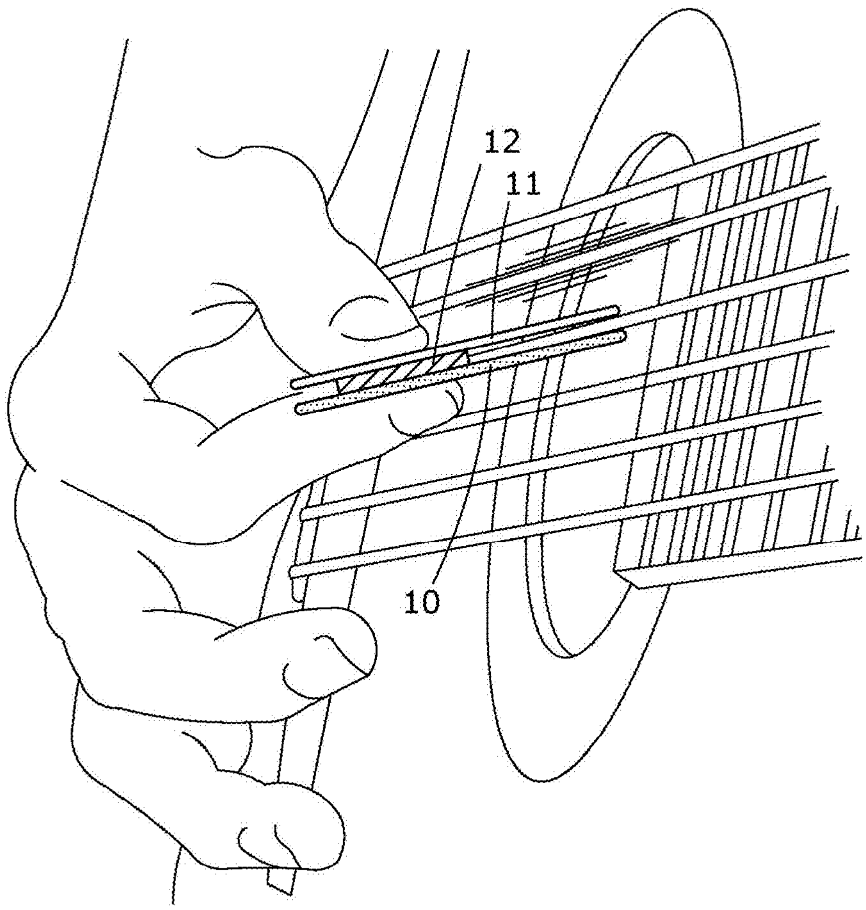
FIG. 4 is perspective view of the guitar being strum with the present invention, light gauge first.

FIG. 4 is perspective view of the guitar being strum with the present invention, light gauge first.

Strumming a guitar with the lighter gauge pick of the present invention hitting the string first will produce a different set of tones when striking the strings than strumming with the heavier gauge pick hitting the strings first followed by the lighter gauge pick.

Depending on the direction the right hand of the guitar player strums the guitar will determine which gauge pick strikes the string first and which gauge string strikes the same string second.

Figure 5:
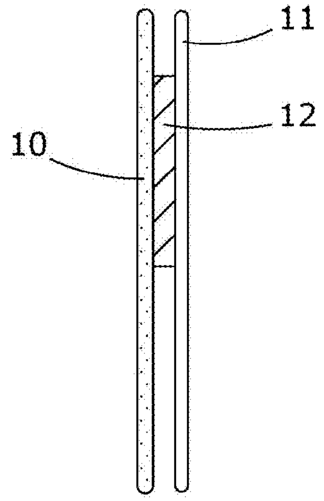
FIG. 5 is a profile view of the present invention showing the 2 mm-3 mm foam adhesive.

FIG. 5 is a profile view of the present invention showing the 2 mm-3 mm foam adhesive.

The 2 mm-3 mm distance separating the two different gauge picks allows for simulating the sound of a 12-string guitar using a 6-string guitar.

The adhesive pad is optimally 2 mm to 3 mm thick. The foam pad adhesive can be constructed from a variety of materials, such as foam, cork, wood, plastic or metal, or can be formed integrally with the pick element. Preferably, however, the pad adhesive is constructed of foam, and is glued or otherwise fastened to the inner faces of pick Further, the use of different pick gauge thickness combinations replicates the lower 3 strings found on a 12-string guitar using a 6-string guitar.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description. Therefore, it is intended that the disclosure not be limited to the particular embodiment(s) disclosed.

What is claimed is:

1. A plectrum, comprising:

a first pick configured for strumming a stringed instrument;

an adhesive pad; and a second pick configured for strumming a stringed instrument, wherein the adhesive pad is positioned between the first pick and the second pick and wherein the adhesive pad is attached to the inner face of the first pick and the inner face of the second pick;

wherein the adhesive pad is made of foam;

wherein said foam allows for the first and second picks to be separated by different distances depending on how it is held by the user;

wherein the first and second picks are configured to be offset translationally and to depress the foam to rotate relative to each other; and wherein the first and second picks are configured to be positioned with one of the picks on one side of a string of a string instrument and the other of the picks on another side of the string while in use.

2. The plectrum of claim 1, wherein the first pick and the second pick are 0.4 mm to 1.2 mm thick.

3. The plectrum of claim 1, wherein the adhesive pad is 2 mm to 3 mm thick.

4. The plectrum of claim 1, wherein the adhesive pad is made of cork.

5. The plectrum of claim 1, wherein the adhesive pad is made of wood.

6. The plectrum of claim 1, wherein the adhesive pad is made of metal.

7. The plectrum of claim 1, wherein the adhesive pad is made of plastic.

8. The plectrum of claim 1, wherein the first pick and the second pick are approximately triangular.

9. The plectrum of claim 1, wherein the adhesive pad is positioned opposite one of the points of the triangle of the first pick and the second pick.

10. The plectrum of claim 1, wherein a gauge of the first pick is different from a gauge of the second pick.

11. The plectrum of claim 1, wherein the first pick and the second pick are constructed from celluloid or ABS plastic.

* * * * *